Patented Aug. 22, 1933

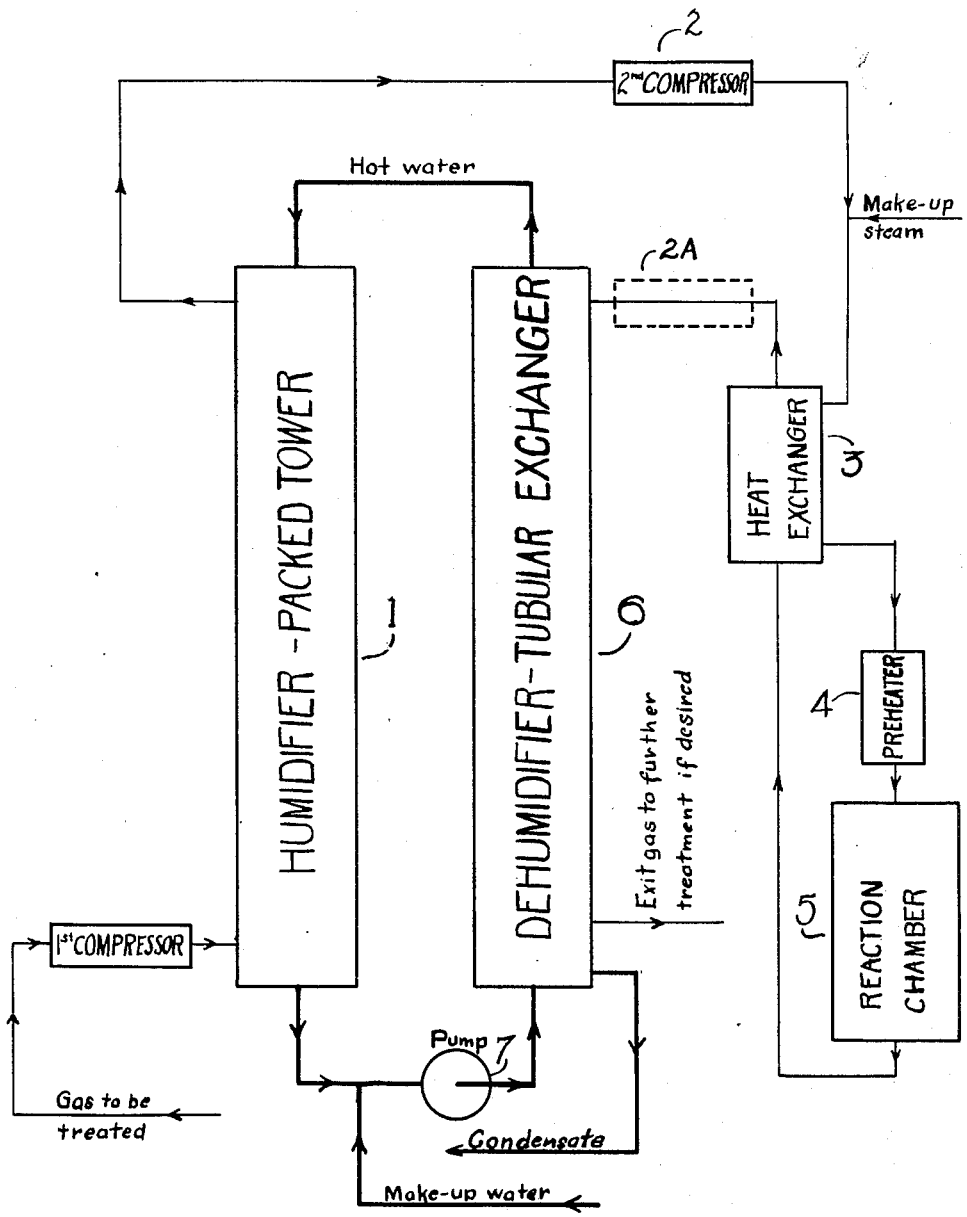

1,923,656

UNITED STATES PATENT OFFICE 1,923,656

HEAT RECOVERY SYSTEM

John S. Beekley, Charleston, W. Va., assignor, by mesne assignments, to E. I. du Pont de Nemours & Company, Wilmington, Del., a Corporation of Delaware Application December 8, 1930. Serial No. 500,825

9 Claims. (Cl. 23—212)

This invention relates to a process for the recovery of heat from gaseous mixtures containing water vapor, and particularly to an improved process in which fresh gas is humidified through utilization of heat recovered from treated gas.

In certain gaseous reactions involving water vapor it is necessary to use an excess thereof over and above the stoichiometric requirement. For instance, in the preparation of hydrogen by the interaction of methane and steam in the presence of a catalyst, a steam:methane ratio as high as 20:1 may be desirable. Likewise, in the catalytic production of hydrogen by the reaction of steam and carbon monoxide, excess steam is required for efficient conversion of the carbon monoxide. In these and similar processes involving the employment of steam in excess of that entering into reaction, and in those in which large amounts of water vapor are formed in the reaction, the hot products of reaction contain much valuable heat, part of which is sensible heat, but most of which is latent heat of vaporization of water. For economical operation on a commercial scale, a large portion of this total heat must be recovered and returned to the system.

Recovery of the sensible heat to any desired practical degree is readily effected by the conventional method of bringing the hot products of reaction into thermal contact with the untreated gas, using, for example, a tubular heat exchanger. Numerous methods have been proposed for accomplishing the recovery of the latent heat. The process generally employed consists in bringing the reaction products into contact with cold water, whereupon they are cooled, a portion of their content of water vapor is condensed, and the water is heated; the hot water thus obtained is brought into contact with the gases to be reacted upon, which are thereby humidified to an extent depending upon operating conditions. While fairly good heat recovery and considerable saving in over-all steam consumption result from the employment of processes of this type, maximum savings are rarely possible in practice because the relatively high resistance to gas flow between the humidification and dehumidification steps seriously limits the efficiency of the recovery operation.

An object of the present invention is to provide a process for the recovery of heat from gaseous mixtures containing water vapor. Another object of this invention is to provide a process for the humidification of a gas or gas mixture and the dehumidification of the corresponding reaction products wherein a high recovery of heat is effected. A still further object includes the process of subjecting the gas or gas mixture to compression prior to humidification and to a second compression prior to dehumidification. Other objects will hereinafter appear.

Processes of the type referred to above in which heat recovered from the reaction products is utilized to humidify fresh gas reduce the amount of heat carried from the system and effect savings in steam consumption. The efficiency of the recovery system is limited not so much by the amount of heat available in the hot products of the reaction (after the usual transfer by thermal exchange of part of their sensible heat to the gases going to reaction), as by the low potential of this heat. As heat is extracted from the hot products of the reaction and their temperature is lowered, latent heat becomes available at their dew point, and in most cases this dew point is lower than the dew point of the desired inlet mixture. This lowering of dew point, that is, lowering of the partial pressure of steam, as the gas mixture passes through the system may result from the consumption of steam and the formation of non-condensible gas in the reaction and/or a decrease in total pressure caused by friction losses through the equipment. As a result of these considerations I have found that the efficiency of heat recovery in processes involving the treatment of gas mixtures containing water vapor can be increased by subjecting the gas mixture to compression between the humidification and dehumidification steps. By this added step in the recovery operation, the dew point of the exit mixture from the humidifier is raised relative to that of the humidified mixture, the potential of the latent heat to be withdrawn from the exit mixture becomes higher, and better heat recovery can be effected. A further feature of my invention, whereby additional operating advantages are realized, results from the compression of the gases in two stages, the first stage prior to humidification and the second stage between humidification and dehumidification. The second compression stage may be applied at any suitable point between humidification and dehumidification. For example, in the hydrocarbon-steam conversion reaction or the water-gas reaction the pressure may be applied between the humidification and conversion step, or after the latter step but prior to dehumidification.

A still further feature of my invention resides in the efficient utilization of the steam generally required to augment the water vapor content of the gas after humidification but prior to conversion. This steam may be generated at such a pressure and superheated to such a degree that after use in furnishing power for the compression operations, its pressure and quality are still such that it can be added to the humidified gas (after compression) as make-up steam. Derivation of power from it can be economically effected by passing it through a turbine. Under many conditions of operation, the additional steam required can be efficiently added through a steam injector. By the injection of steam at a suitable temperature and pressure through such a mechanism the desired raising of the pressure and dew point during dehumidification over the same during humidification can be accomplished, and with the further advantage of small capital outlay.

The fraction of the total compression to be carried out in each of the two stages varies, but for each individual case there is an optimum division, which depends upon operating pressure, steam requirement, etc. However, to gain full advantage of this invention, the division must in all cases be such that the average pressure in the gases during dehumidification is greater than the average pressure on the gases during humidification. In conducting processes at pressures sensibly above atmospheric pressure, it is customary to compress the gases to the desired pressure in a single operation prior to humidification. It is not patent that there could be any utility in compressing the cold, dry gas to, say, 10 atmospheres, humidifying it, and then compressing the much greater volume of hot humidified gas to, say, 12 atmospheres, over compressing the cold, dry gas directly to 12 atmospheres, and humidifying it at that pressure. It was, therefore, not to be expected that economies of operation would result from the division of the compression operation into two stages as described above. This, however, is the case since the savings realized through the more complete recovery of heat thereby effected more than balance the added cost of compression, even when no power is extracted from the make-up steam before its injection into the humidified gas, and greatly outbalance it when the make-up steam has already been utilized to furnish power for compression.

I will now describe one manner in which my invention may be applied but it will be understood that the details of operation therein given may vary through wide limits without in any way departing from the scope of this invention.

By reference to the accompanying flow sheet, which shows one general system of operations in which my invention may be applied, the following description of a process, in which a hydrocarbon and steam are subjected to the action of a catalyst whereby the hydrocarbon is converted into hydrogen, will be more clearly understood. The water-gas reactions and numerous other reactions can be carried out in much the same manner. The hydrocarbon, after compression to a pressure of from 10 to 30 atmospheres, is passed upwardly through a humidifier 1, which may be of any suitable type of construction, for example, a packed tower. In passing through the humidifier 1 the hydrocarbon contacts with hot water flowing counter-current to it. The hydrocarbon is thereby saturated with water vapor and passes directly from the humidifier 1 into a turbo-compressor 2 in which its pressure is increased from two to four atmospheres above the initial pressure applied prior to humidification, or the compression at this point may be effected by the use of a steam injector, not shown. The mixture after the addition of any further steam, if required, then passes through a heat exchanger 3 of any conventional type in which it receives heat from the hot products of reaction, and thence through a preheater 4 and into the reaction chamber 5. In the preheater 4 heat is supplied equivalent to that absorbed in the reaction and also any additional heat which may be required for the maintenance of a given temperature at the exit of the reaction chamber 5. If desired, the preheater 4 and the reaction chamber 5 may be combined as a single piece of equipment. The gases after reaction over the catalyst leave the reaction chamber and pass through the heat exchanger 3 and into the dehumidifier 6, which is shown as a tubular exchanger. Water flowing (through the tubes) counter-current to the direction of gas flow (outside the tubes) absorbs heat as the gas mixture cools and steam in it is condensed. From the dehumidifier 6 the cooled gas passes on to any treatment which may be necessary to render it suitable for its intended use. Any condensed water leaving the dehumidifier 6 with the gas may be collected and returned to the system. The hot water emerging from the dehumidifier 6 is injected into the humidifier 1. Evaporation of a part of it there affords the steam in the humidified mixture leaving this piece of equipment. Because of the heat required for this evaporation and for heating the gas to the temperature at which it leaves the humidifier 1, the unevaporated water is very considerably cooled. From the humidifier 1 it is returned by a suitable pump 7 to the dehumidifier and the cycle repeated. Make-up water, of which a portion may be the condensate collected in the dehumidifier, may be added at any point in the water cycle, but it is preferable to add it to the colder water leaving the humidifier or entering the dehumidifier. Of course, if a packed tower is used for a dehumidifier instead of a tubular exchanger, the reaction products and the cycle water come into direct contact and any water condensed from the reaction products becomes a part of the cycle water.

The second compression operation either by a suitable compressor, steam injector or other means, may be effected directly following humidification, as shown in the diagram (solid lines) 2, or just prior to dehumidification (dotted lines) 2—A, or at both points. When it happens, as is usually the case, that more steam is required for reaction than is present in the humidified gas, make-up steam is added to the mixture prior to its passage through the heat exchanger. (If a steam injector is used this additional step is not, of course, required.) I have found that this quantity of steam, if generated at the proper pressure and then superheated to the proper temperature, will yield by expansion through a turbine enough power to accomplish the second compression and still be at sufficiently high pressure and of sufficiently high quality for direct injection into the humidified mixture after its compression.

Even when the operations are carried out in the most efficient of the various ways heretofore mentioned, the gas mixture leaves the dehumidifier at temperatures appreciably above atmospheric temperature and contains considerable valuable heat, of low potential, to be sure. A goodly fraction of this heat may be utilized to generate low pressure steam from water condensed in the system and/or water from an outside source. This low pressure steam may be used in any of the usual ways in which low pressure steam is used, or it may be compressed to such a pressure that it can be injected into the system as make-up steam.

From a consideration of the above description, it will be realized that any gaseous reaction involving humidification and dehumidification in which pressure is employed between these two operations, and particularly when pressure is employed prior to humidification and between humidification and dehumidification, will come within the scope of this invention without in any way sacrificing the advantages derived therefrom.

I claim:

1. In a process for the recovery of heat from gases containing water vapor employing humidification and dehumidification the steps which comprise compressing the gas in two stages, the first stage prior to humidification, the second stage between humidification and dehumidification.

2. In a process for the recovery of heat from gases containing water vapor employing humidification and dehumidification the steps which comprise compressing the gas in two stages, the first stage prior to humidification, the second stage between humidification and dehumidification, the pressure of the gases being appreciably greater during dehumidification than during humidification.

3. In a process for the recovery of heat from gases containing water vapor involving humidification and dehumidification the step which comprises increasing the potential of the latent heat in the gases after humidification by raising their dew point appreciably above the dew point of the humidified gases.

4. In a process for the recovery of heat from gases containing water vapor involving humidification and dehumidification the step which comprises increasing the pressure on the gases after humidification thereby raising their dew point appreciably above the dew point of the humidified gas.

5. In a process employing humidification and dehumidification and involving the conversion of gaseous reactants in the presence of water vapor at elevated pressure the steps which comprise compressing the gases in two stages, the first stage prior to humidification, the second stage between humidification and dehumidification.

6. In a process employing humidification and dehumidification and involving the conversion of gaseous reactants in the presence of water vapor at elevated pressure, the step which comprises maintaining the average pressure during dehumidification appreciably greater than the average pressure during humidification.

7. In a process employing humidification and dehumidification and involving the conversion of gaseous reactants in the presence of water vapor at elevated pressure, the steps which comprise compressing the gases in two stages, the first stage prior to humidification and conversion, the second stage between conversion and dehumidification.

8. In a process employing humidification and dehumidification in the preparation of hydrogen by the interaction of a hydrocarbon and steam in the presence of a catalyst at elevated pressure, the steps which comprise compressing the gases in two stages, the first stage prior to humidification, the second stage between humidification and dehumidification, whereby the pressure during humidification is appreciably greater than the pressure during dehumidification.

9. In a process employing humidification and dehumidification in the preparation of hydrogen by the interaction of a hydrocarbon and steam in the presence of a catalyst at elevated pressure, the steps which comprise initially compressing the hydrocarbon to a pressure of from 10–30 atmospheres prior to humidification and increasing the pressure of the hydrocarbon and steam by 2–4 atmospheres above its initial pressure between humidification and dehumidification.

JOHN S. BEEKLEY.